UNITED STATES PATENT OFFICE.

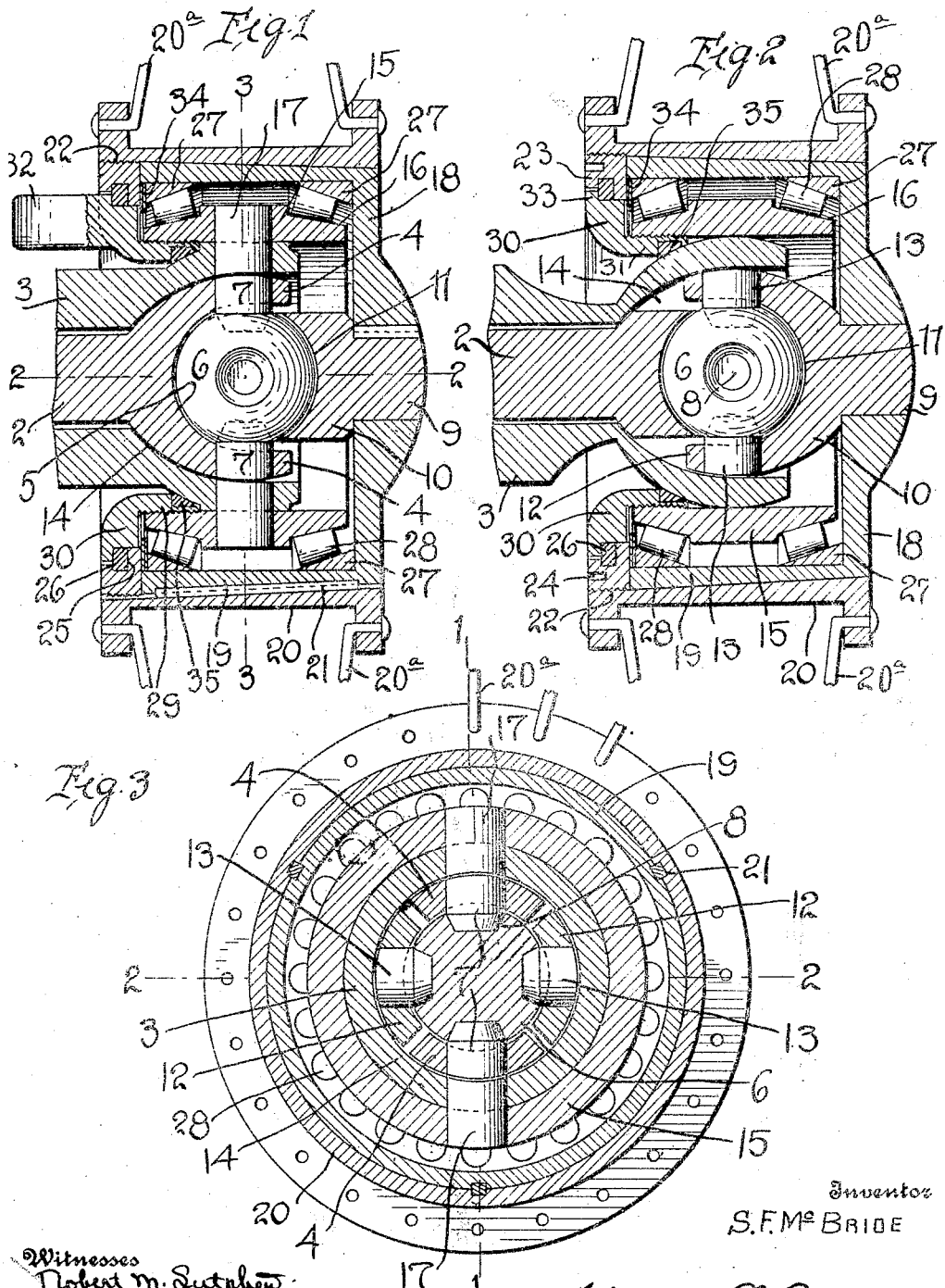

SAMUEL F. McBRIDE, OF BIRMINGHAM, ALABAMA.

WHEEL-MOUNTING.

1,147,739.

Specification of Letters Patent.

Patented July 27, 1915.

Application filed December 17, 1914. Serial No. 877,749.

*To all whom it may concern:*

Be it known that I, SAMUEL F. MCBRIDE, a citizen of the United States, residing at Birmingham, in the county of Jefferson and State of Alabama, have invented certain new and useful Improvements in Wheel-Mountings, of which the following is a specification, reference being had to the accompanying drawings.

My invention relates to bearings, and particularly to bearings for vehicle wheels.

The primary object of my invention is the provision of a bearing so constructed that the bearing is entirely housed within the hub of the wheel, thus preventing dust and dirt from getting into the bearing and economizing oil, and is further so constructed that the wheel may turn easily upon a vertical axis to permit the wheel to be shifted for steering, its steering axis being disposed also entirely within the hub of the wheel.

A further object is to provide for the ready disassembling of the parts or the ready assembling of the parts, or for the removal of the wheel and for the adjustment of the anti-friction bearings disposed within the hub.

Other objects will appear in the course of the following description.

My invention is illustrated in the accompanying drawings, wherein—

Figure 1 is a section on the line 1—1 of Fig. 3; Fig. 2 is a section on the line 2—2 of Figs. 1 and 3; Fig. 3 is a section on the line 3—3 of Fig. 1.

Corresponding and like parts are referred to in the following description and designated in all parts of the accompanying drawings by like reference numerals.

Referring to these drawings, 2 designates a shaft, and 3 the axle which forms a housing for the shaft. The shaft 2 at opposite ends is formed with the arms 4 and with a partly spherical recess 5. Disposed within this recess 5 and between the arms 4 is the ball 6 of a universal joint. Pins 7 extend inward from the arms 4, and the tapered ends of these pins enter sockets 8 formed in diametrically opposite portions of the ball 6. The hub end of the shaft 2 is designated 9, and is also formed at its inner end with an enlarged head 10 having a concave recess 11 in its end, within which a portion of the ball 6 fits. This head 10 is formed with arms 12, as illustrated in Fig. 2, which arms are disposed in a plane at right angles to the arms 4. Pins 13 extend inward from the arms 12, and the tapered ends of these pins fit in the sockets formed in diametrically opposite portions of the ball 6. It will thus be seen that I provide a universal joint between the main portion of the driving shaft 2 and the hub portion 9, thereby permitting the hub portion 9 to turn angularly with respect to the main portion 2, but causing the portions 2 and 9 to rotate together.

The housing 3 at its hub end is enlarged and formed with a nearly spherical recess or chamber, designated 14, which surrounds the meeting ends of the arms 4 and 12 and incloses the ball 6 and the meeting ends of the arms.

Surrounding the end of the axle or housing 3 is an annular bearing ring designated 15. The inner face of this bearing ring is transversely straight, while its outer face is provided upon its lateral margins with the inclined roller engaging faces 16. This ring 15 at opposite points in its diameter has pins 17 which are driven into the ends of the housing 3, these pins having their axes coincident with the plane of the axes of the pins 7 and forming pivots upon which the bearing ring 15 may turn in a horizontal plane.

Mounted upon the reduced end of the shaft section 9 and rotatable therewith is a hub cap 18 which is preferably keyed to the shaft extension 9. This hub cap is formed with the inwardly extending flange 19, the outer face of which is inclined outward and toward the middle of the shaft 2.

Disposed upon this flange and fitting snugly thereto is the hub 20 to which the spokes 20ª are connected in any suitable manner. The inner face of this hub 20 is beveled to fit the bevel of the exterior face of the flange 19, and preferably the hub is keyed or otherwise fastened to the flange 19, as by means of the key 21. The inner end of the hub is interiorly screw threaded as at 22 for engagement with an annular nut 23 formed with wrench recesses 24 whereby the ring may be turned into place. The inner diameter of this ring is recessed as at 25 for the reception of a leather packing ring 26.

Disposed within the flange 19 at its inner end and at the intersection of the flange with the hub cap 18 are the bearing adjusting rings 27 or cones, the inner faces of which are beveled and confront the beveled faces of the ring 15, and disposed between the cones 27 and the beveled faces of the bearing ring 15 are the tapered anti-friction rollers 28. The annular bearing ring 15 is interiorly screw threaded at one end as at 29, and disposed within the nut 23 is an annulus 30 having at its inner end the inwardly extending flange 31 which is exteriorly screw threaded for engagement with the interior screw threads 29. Where the wheel is to be used as a steering wheel, this annulus 30 is formed with the angularly extending arm 32, which in turn is connected with the usual steering knuckle and steering rod of the automobile or other vehicle. The annulus 30 is formed with a shoulder 33 which bears against the packing 26. Shims or liners 34 are preferably disposed between the end of the innermost cone 27 and the nut 23, so that as the nut is turned the cone 27 on that side will be adjusted inward into the hub. This of course will tighten up upon the roller bearings on that side. The rotation of the annulus 30 will also cause the transverse adjustment of the bearing ring 15, which will adjust the roller bearings on the opposite side or outer end of the hub. A packing ring 35 carried by the annulus 30 and having an inner beveled face surrounds and bears against the enlarged head of the axle 3 and may be adjusted against this head by rotating the annulus 30.

The operation of my invention will be obvious from what has gone before. The hub as constructed provides for free rotation of the wheel in a horizontal plane as well as a rotation of the wheel in a vertical plane. The pivotal axis upon which the wheel rotates for steering movement is disposed in a plane which coincides with the vertical plane of the wheel rim, thus relieving the wheel of the strains to which it is incident when the steering axis is disposed exteriorly of the wheel as is ordinarily the case. The parts of the wheel may be readily kept tight so as to take up wear, the parts are all entirely housed within the hub, and it is impossible for dust to have access to the interior of the hub by reason of the fact that the packing ring 35 bears tightly against the enlarged head of the axle.

My invention is applicable to all manner of vehicle wheels, but particularly applicable to the wheels of automobiles and like vehicles.

Having described my invention, what I claim is:

1. In a wheel mounting, an axle having an enlarged head, an annular bearing ring surrounding the enlarged head of the axle, pivot pins extending through the bearing ring and into said head, said bearing ring having beveled lateral margins, a hub cap operatively connected to the axle and having an inwardly extending annular flange and a hub detachably mounted thereon, the contacting faces of the flange and the hub being transversely inclined to permit the hub to be detached from the flange by a transversely sliding movement, cones disposed within the flange, oppositely disposed anti-friction rollers located between the cones and the margins of the bearing rings, an annular nut having screw threaded engagement with the inner end of the hub and bearing against the inner end of the cap flange, and shims disposed between said nut and the inner end of the adjacent cone.

2. In a wheel mounting, a hollow axle having a hollow enlarged end, a shaft housed within the axle and having a main section and an end section connected by a universal joint, an annular bearing ring surrounding the enlarged head of the axle, pivot pins passing through said bearing ring and into said head and being coincident with the pivotal axis of the universal joint, said bearing ring having beveled lateral margins, a hub cap mounted upon and rotatable with the end section of the shaft and having an inwardly extending flange, a hub engaging with said flange but projecting beyond it at its end and internally screw threaded at this end, cones disposed within the inwardly extending flange of the cap, tapered anti-friction rollers disposed between the cones and the beveled margins of the ring, an annular nut having screw threaded engagement with the screw threads on the hub and bearing against the end of the flange, shims disposed between said nut and the adjacent cones, a packing ring carried on the inner face of the nut, a packing ring extending around the head of the axle and disposed against the head and an annulus having a flange exteriorly screw threaded to engage screw threads on the inner face of the bearing ring. the end of said flange carrying said last named packing ring, the outer face of the annulus bearing against the packing ring carried by the nut.

3. In a wheel mounting, an axle, an annular bearing ring pivotally mounted on the axle for horizontal movement, a hub cap having an inwardly extending flange surrounding the bearing ring, a hub surrounding the cap and resting thereon, anti-friction cones and rollers disposed between the bearing ring and the flange of the cap, an annular nut having screw threaded engagement with the hub, and an annular member having screw threaded engagement with the bearing ring and operatively engaging with the nut to lock it in place.

4. In a wheel mounting, an axle, an annular bearing ring pivotally mounted thereon for movement in a horizontal plane, a hub cap having an inwardly extending flange formed with a beveled periphery, a hub surrounding the cap and having a beveled inner periphery complementary to the periphery of the cap, anti-friction cones and rollers disposed between the bearing ring and the cap flange, an annular nut having screw threaded engagement with the hub, an annular member having screw threaded engagement with the bearing ring, said nut and member having complementary confronting recesses, and a packing ring disposed in said recesses.

In testimony whereof I hereunto affix my signature in the presence of two witnesses.

SAMUEL F. McBRIDE.

Witnesses:
W. S. HAMMETT,
J. G. DAVIS.